United States Patent Office 2,879,171
Patented Mar. 24, 1959

2,879,171

PAINT FOR HIGHWAY MARKING AND THE LIKE

Fred J. Kullenberg, Millbrae, Calif., assignor to W. P. Fuller & Co., San Francisco, Calif., a corporation of California No Drawing. Application November 18, 1955
Serial No. 547,859

5 Claims. (Cl. 106—170)

This invention relates to a highway marking paint and the like of the type employing a reflecting aggregate such as glass beads bonded to a road surface by paint.

A principal object of this invention is to solve the problems occasioned by the two principal systems heretofore used to provide on the pavement a white line incorporating a reflectorized glass-bead surface. The older approach (exemplified by Shuger Patent #2,268,537) employed a two-step process: the paint binder was first sprayed on the road and then the beads were dropped on to the paint. A newer system (exemplified by the Heltzer Patent #2,574,971) provided a mixture: the glass beads were dispersed throughout the paint and the mixture was sprayed on in one step. The newer system provided a paint that lasted much longer than that of the older system, but it had the disadvantage that, when first applied, the amount of reflection is limited: it does increase with use, due to the wearing away of the paint which initially covers the beads. The older system had the advantage that the beads were well exposed from the very beginning, but had the disadvantage of being a two-step system and of losing its reflectance during use because beads got lost more easily as the binder was worn away, due to a poor retaining action by the paint.

The present invention, like the newer method, provides a one-step system in which the beads are pre-mixed with the paint vehicle but, unlike the newer system, the paint vehicle has the novel feature that a large proportion, substantially all, of the beads are exposed from the very beginning and so give the desired reflectance without waiting for any wearing away. Yet the paint of the present invention has a long life because of a novel binding action of a new type of vehicle; so the beads are not easily torn off and lost.

Thus, it is an object of the present invention to provide highway marking paint incorporating glass beads in which there is exceedingly good reflectance from the time of application, coupled with adaptability to a one-step process of application and long wearing life.

Another important problem solved by this invention is the coating of vertically disposed surfaces with a reflecting bead type of paint. The prior art paint of the Heltzer type is not, as has been said, sufficiently reflective until the paint film, with which the beads are pre-mixed, has been abraded away. Therefore, vertical surfaces and other surfaces not subject to abrasion never become fully reflective.

Furthermore, when using the older type of paint, it is difficult to sprinkle beads on a vertical surface with sufficient uniformity. So there had heretofore been no satisfactory way to place a highly reflective surface on vertical surfaces like curbs and highway signs and posts already in place.

An object of this invention is to solve this problem and to make it just as easy to apply paint containing reflective aggregate to a vertical surface as to a horizontal surface.

Another object is to provide a ready-mixed reflective-aggregate type of paint not requiring any abrasion before achieving its full reflectance value and therefore suitable for use on curbs, signs, posts, and the like.

The present invention achieves these important objects by dispersing the small glass beads (or other type of reflecting aggregate) in a stabilized aqueous dispersion of a coating composition, instead of in the pigmented varnish-type vehicle disclosed in Heltzer's patent. This new combination produces a novel result: the drying of the aqueous phase causes the dispersed phase of the coating composition to shrink around the beads and hold them very tightly while at the same time some force (probably a combination of gravity, adherence to the pavement or curb and the shrinkage) carries the coating away from the upper faces of the beads, exposing their upper portions. In effect it encases them like rhinestones in a setting and holds them in a firm jacket.

Other objects, advantages and features of the invention will appear from the following description of some preferred embodiments thereof.

The glass beads may be substantially the same size and type as those used by the Heltzer Patent 2,574,971, transparent beads of an average diameter of about 3–10 mils. They may be present in varying quantities but it appears that normally the best results will be obtained when there are about 3–8 pounds of beads per gallon of the bead-free vehicle. In place of glass beads, other separate, non-coalescing particulate material may be used, generally referred to herein as a reflective aggregate.

The vehicle itself preferably the one described by John C. Zola in Patent #2,591,904, issued April 8, 1952, in which particles of a viscous coating material are dispersed in a water solution containing a colloidal-suspension stabilizer. The stabilizer prevents appreciable coalescence, but is not used in quantities sufficient to cause the particles to fully emulsify. As a result, the coating particles of the dispersed phase generally exceed 50 microns in size and may be as large as 2,500 microns.

The dispersed phase may be a nitrocellulose lacquer composed of the following:

| | Pounds |
|---|---|
| Titanium dioxide | 12 |
| Nitrocellulose 5–6 sec. (30% wet) | 15 |
| Ester gum | 10 |
| Castor oil | 2 |
| Dibutyl phthalate | 2 |
| Butyl alcohol | 4 |
| Butyl acetate | 8 |
| Methyl amyl acetate | 13 |
| Toluol | 17 |
| Xylol | 17 |
| | 100 |

Or it may be a synthetic enamel such as the following:

| | Pounds |
|---|---|
| Chome yellow pigment | 28 |
| Urea formaldehyde resin (50% solution in butyl alcohol) | 14 |
| 50% soy bean alkyd resin in xylol | 58 |
| | 100 |

Another example of the composition of the dispersed phase would be

| | Pounds |
|---|---|
| Titanium dioxide | 25 |
| Polystyrene resin (mol. wt. about 50,000) | 25 |
| Xylol | 50 |
| | 100 |

The continuous phase consists of a protective colloid or stabilizer dissolved in water. The selection of the particular protective colloid and the amount of such protective colloid to use depends to a large extent upon the nature of the solvents incorporated in the dispersed or discontinuous phase.

For example, with nitrocellulose lacquers and other coating materials containing polar solvents or mixtures of polar and non-polar solvents, the following protective colloids have been found to work well in the percentages given:

| | Percent |
|---|---|
| Methyl cellulose (15 cps.) | 0.3 to 2 |
| Ethyl cellulose (low viscosity, water soluble) | 0.5 to 3 |
| Polyvinyl alcohol (medium viscosity) | 0.3 to 2 |
| Casein (acid precipitated) | 0.5 to 2 |
| Gum tragacanth | 0.5 to 1 |
| Locust bean gum | 0.3 to 1 |
| Cellulose acetate phthalate | 0.3 to 3 |

On the other hand for dispersing synthetic enamels and for oil base paints which ordinarily contain non-polar solvents, such as aromatic or aliphatic hydrocarbons, the following protective colloids have been found to work well and preferably are employed in the percentages by weight as indicated:

| | Percent |
|---|---|
| Polyvinyl alcohol (medium viscosity) | 0.5 to 5 |
| Quince seed extract | 0.3 to 1.5 |
| Ethyl cellulose (low viscosity, water soluble) | 1 to 5 |
| Cellulose acetate phthalate | 1 to 5 |
| Bentonite | 1 to 10 |
| Methyl cellulose (15 cps.) | 1 to 5 |
| Polystyrene ammonium maleate | 1 to 5 |

There are also numerous other natural and synthetic gums mentioned in Patent 2,591,904 which are less satisfactory, either because of lower solubility in water or because much higher concentrations are necessary.

The concentration of the protective colloid in the aqueous phase is a large factor in determining the size and shape of the dispersed particles of coating material.

After the preparation of each phase separately, the preparation of the dispersion is simple, and the equipment is inexpensive and available in most paint or lacquer plants. A tank or mixing kettle fitted with a speed controlled agitator, such as a two or three-bladed rotary propeller type of agitator, is adequate. Special equipment such as grinding mills, colloid mills, homogenizers and the like are not necessary and, in fact, undesirable for preparing these dispersions.

If a lacquer dispersion is to be prepared using the white nitrocellulose lacquer cited earlier, weigh 50 parts of a 1% methyl cellulose (15 cps.) solution into the mixing kettle, and, with the agitator rotating at approximately 600 r.p.m., add slowly, in a continuous stream, 100 parts of the white nitrocellulose lacquer. Continue mixing for about 5 to 10 minutes after the addition of the lacquer has been completed.

The vehicle is now ready for addition of the glass beads or other reflective aggregate in a quantity of 3-8 pounds of beads per gallon of vehicle and mixture. The mixture may then be transported to the desired place and applied by spray gun, by brush, or by flowing it on. As the water evaporates, the particles of the dispersed phase gradually shrink to form a film and, as they do so embrace the beads tightly, shrinking off their upper surface, so that the upper surface of the glass beads is exposed and is immediately therefore able to act as a reflecting agent. When dry and hard, the coating holds the beads (glass or other reflecting aggregate) tightly and resists the wearing away of the beads.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A new paint consisting essentially of the combination of separate non-coalescing reflecting particulate material having an average diameter of about 3 to 10 mils carried in a medium of a stabilized aqueous dispersion of a pigmented coating composition whose particles exceed 50 microns in size substantially larger than emulsion size but do not coalesce, whereby when said medium dries on a surface said coating composition physically retains said particulate material while exposing the bulk of said particulate material to view.

2. A method of adhering particulate non-coalescing reflecting material having an average diameter of about 3 to 10 mils to a surface while exposing said particulate material to view, comprising the steps of mixing said particulate material with a pigmented coating material in particles between about 50 and 2500 microns in a stabilized aqueous phase, applying the mixture to said surface, and drying said mixture, whereby the water evaporates and the coating particles shrink together on said surface, exposing the outer surface of the particulate material.

3. A highly reflective paint for highway marking and the like consisting essentially of a mixture of about 3 to 8 pounds of glass beads between 3 and 10 mils in size with about one gallon of a stabilized aqueous dispersion of discrete pigmented coating particles of between about 50 and 2500 microns in size whereby the glass beads are retained on the surface by the shrinkage of the coating material when the water dries, and whereby the majority of glass beads are exposed by the shrinkage of said dried coating composition and are therefore able to reflect light immediately after application.

4. A highly reflective paint for highway marking and the like, consisting essentially of a mixture of small-particled highly reflective aggregate in a stabilized aqueous dispersion of a pigmented coating composition, whereby the aggregate is retained on the surface by the coating material when the aqueous dispersion dries, and the majority of particles of aggregate are not coated over by said dried coating composition but are therefore immediately exposed to view.

5. A highly reflective paint for highway marking and the like consisting essentially of a mixture of about 3 to 8 pounds of highly reflective aggregate in particles between 3 and 10 mils in size with about one gallon of a stabilized aqueous dispersion of discrete pigmented coating material of between about 50 and 2500 microns in size whereby the aggregate is retained on the surface by the shrinkage of the coating material when the water dries, and whereby the majority of particles are exposed by the shrinkage of said dried coating composition and are therefore able to reflect light immediately after application.

References Cited in the file of this patent

UNITED STATES PATENTS

| | | |
|---|---|---|
| 2,574,971 | Heltzer | Nov. 13, 1951 |
| 2,574,972 | Hill | Nov. 13, 1951 |
| 2,591,904 | Zola | Apr. 8, 1952 |
| 2,646,364 | Porth | July 21, 1953 |